Oct. 4, 1966    L. W. BEAUDOIN ET AL    3,277,324
PERMANENT MAGNET POLE PIECE
Original Filed Nov. 20, 1962
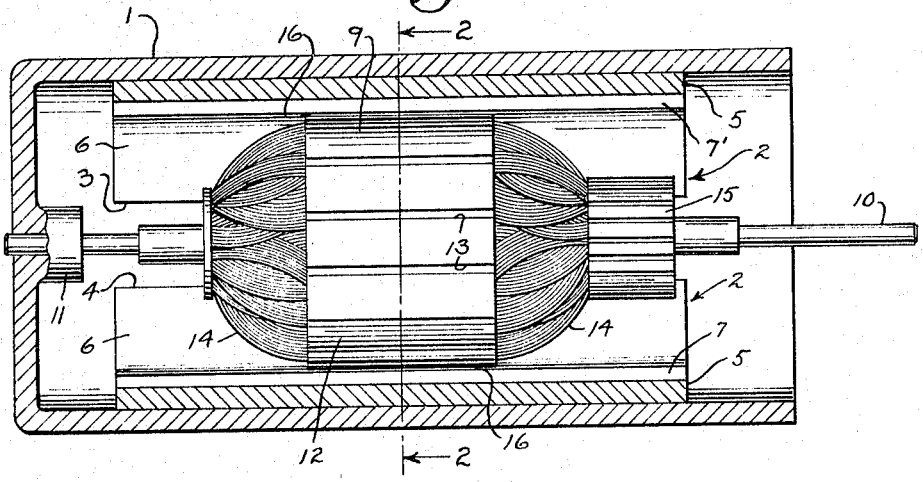
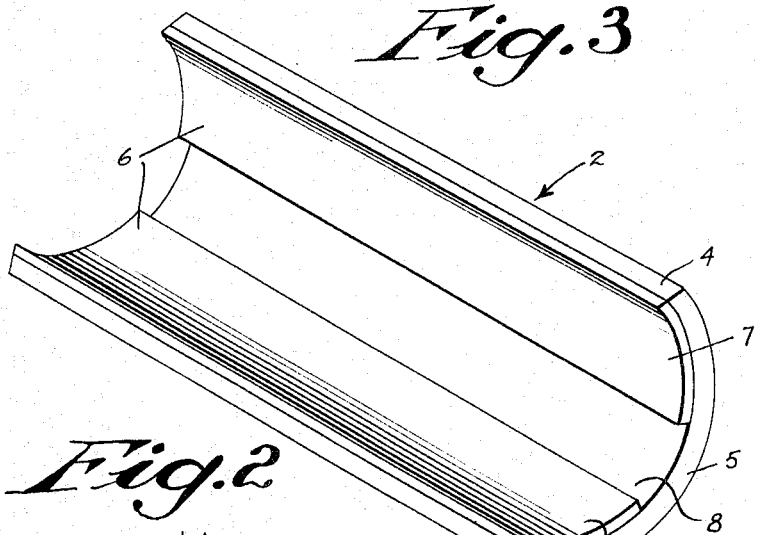
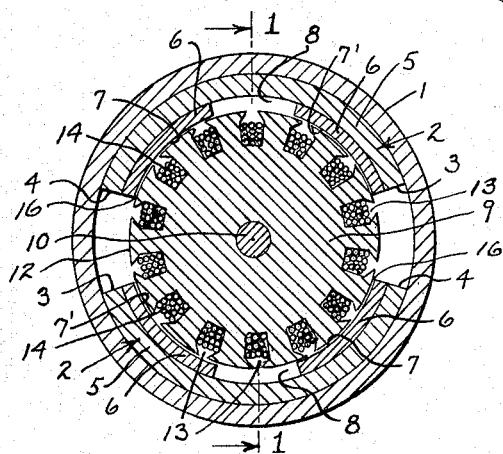
INVENTORS
LEONARD W. BEAUDOIN
LEONARD W. LENIEWSKI
BY
Arthur H. Seidel
ATTORNEY

United States Patent Office

3,277,324
Patented Oct. 4, 1966

3,277,324
PERMANENT MAGNET POLE PIECE
Leonard W. Beaudoin and Leonard W. Leniewski, New Berlin, Wis., assignors to Allen-Bradley Company, Milwaukee, Wis., a corporation of Wisconsin
Continuation of application Ser. No. 238,960, Nov. 20, 1962. This application July 21, 1965, Ser. No. 477,082
5 Claims. (Cl. 310—154)

This application is a continuation of the application by the same inventors, Ser. No. 238,960, originally filed on Nov. 20, 1962, now abandoned.

The present invention relates to pole pieces for permanent magnet dynamos, and more particularly it resides in the combination of a pole core having low permeability and a pole shoe having high permeability, said pole shoe being mounted across a portion of a pole core face adjacent a pole tip to distribute armature flux across the pole core face during a locked armature condition.

Extraordinary magnetic properties of ceramic magnetic materials, such as the hard ferrites, have given them wide application in pole pieces for permanent magnet electric motors. Moreover, the magnetic properties of such materials may be enhanced by orienting the crystals of the material during the manufacture of the pole pieces themselves. However, the use of such materials in motors has not been without defects. With both oriented and non-oriented ceramic materials, axially elongated pole pieces were required to achieve the desired rating. In order to achieve the advantages of an elongated pole piece, it was necessary to make the armature as long as the pole pieces, for any added portion of the pole pieces beyond the end of the armature was found to have little or no effect upon the rating of the motor. Also, it was discovered when motors using oriented ceramic pole pieces were subjected to the high armature fields resulting from a high current locked armature condition, the motors displayed thereafter a higher no-load speed with a significant reduction in power under high torque conditions, tending to indicate a partial demagnetization of the pole pieces.

The vulnerability of the oriented ceramic material to the demagnetization field of a locked armature indicated a requirement for a pole piece with greater magnetic length, and hence a pole piece with greater radial width increasing the overall diameter of the motor. Thus, to attain the advantage of an oriented ceramic material, it was necessary to increase this radial width of the pole pieces approximately 35% over that of the non-oriented material, and such increase in size was, in many applications, prohibitive. It was also discovered that the demagnetization of the pole pieces was occurring in a fairly well defined area adjacent the trailing tips of the poles, and that the areas of the pole pieces adjacent their leading tips were being subjected to a magnetizing force.

To overcome those defects the idea was conceived of mounting a magnetic shoe of relatively permeable material across the face of the pole piece to distribute the armature flux with great uniformity across the pole face area. Subsequent experiment showed that a pole piece of oriented ceramic material having a pole shoe of iron, or other high permeability material, manifested a dramatic reduction in vulnerability to demagnetization fields. However, it was also found that a permanent magnet motor utilizing a pole shoe covering the entire face of the pole piece suffered a considerable loss of power. On the theory that this loss of power was due to a shunting of flux through the pole shoe, the pole shoe was split intermediate its leading and trailing tips, so as to leave an air gap in the center of the pole shoe sufficient to interrupt the magnetic circuit, and the split pole shoe proved entirely successful in eliminating the previously experienced power loss. Moreover, it was discovered that with the use of highly permeable pole shoes, it was possible to extend the axial length of the pole pieces far beyond the ends of the armature, thus greatly enhancing the rating of the motor without otherwise changing its dimensions. Also, the radial width of the pole piece could be maintained within a small dimension by use of a pole shoe of permeable material.

Although the preferred embodiment of the invention to be described appears to have its most immediate commercial value in electric motors, such as those used to drive vehicle windshield wipers, the utility of this invention is not so limited. In fact, any person skilled in the art will readily perceive its application in other sorts of energy converters. Hence, the word "dynamo" will be used in the claims to encompass energy converters generally, including motors such as the one described in the embodiment set forth below.

Accordingly, it is an object of the present invention to provide a pole piece for a dynamo which will withstand a high demagnetization force.

It is another object of the present invention to provide a pole piece, for a dynamo of maximum rating, which is of a minimum magnetic length.

It is another object of the present invention to provide a pole piece for a permanent magnet dynamo which will provide a maximum rating with a minimum space.

It is another object of the present invention to provide a permanent magnet dynamo having a high operating efficiency.

It is another object of the present invention to provide an oriented ceramic magnetic pole piece for a permanent magnet dynamo which pole piece will display a maximum resistance to the demagnetizing influence of the armature field produced in a locked armature condition.

The foregoing and other objects will appear in the description to follow. In the description, reference is made to the accompanying drawings which form a part hereof and in which there is shown by way of illustration a specific embodiment in which this invention may be practiced. This embodiment will be described in sufficient detail to enable those skilled in the art to practice this invention, but it is to be understood that other embodiments of the invention may be used and that structural changes may be made in the embodiment described without departing from the scope of the invention. Consequently, the following detailed description is not to be taken in a limiting sense; instead, the scope of the present invention is best defined by the appendant claims.

In the drawings:

FIG. 1 is a view partly in section of a permanent magnet motor embodying the present invention taken along the lines 1—1 in FIG. 2, FIG. 2 is a view in section taken along the line 2—2 in FIG. 1 of the preferred embodiment of the present invention shown in FIG. 1, and FIG. 3 is a view in perspective of one pole piece from the motor shown in FIGS. 1 and 2 embodying the present invention.

Referring now specifically to the drawings, the motor embodying the present invention has a motor shell 1 of cylindrical shape and made from a magnetic material. Mounted on the inside surfaces of the motor shell 1 are opposing pole pieces 2. The pole pieces 2 are structurally identical, and in the present embodiment of this invention the distance between the leading tip 3 and the trailing tip 4 of each pole piece 2 is about 145°. Each pole piece 2 has a permanently magnetized pole core 5 in the form of a circular cylindrical segment that has a back face which mates against the inner surface of the shell 1 and a front face directed radially inward to provide a magnetic pole for the dynamo. Each core 5 is made up of a magnetically hard, oriented ferrite, ceramic, or metal oxide material that exhibits desirable magnetic flux values and a very low permeability approximately equal to air. The cores 5 are radially magnetized to present usual polarities at their front faces, and the shell 1 completes a stationary magnetic path for returning flux from the back face of one core 5 to the other core 5. Finally, as appears in the drawings, the pole cores 5 are particularly characterized in having an extremely short magnetic length, which in this embodiment appears as a very small radial width, as compared with the magnetic length conventionally required in prior art motors. This gives the over all pole pieces 2 a small magnetic length or radial dimension, and the motor as a whole a small diameter.

A split pole shoe 6 is mounted on the inside surface of each core 5, each split shoe 6 having one portion 7 extending circumferentially to a point adjacent the trailing tip 4 of its pole piece 2 and the other portion 7' extending to a point adjacent the leading tip 3 of the pole piece 2. An air gap 8 of substantial circumferential extent runs axially between the pole shoe portions 7 and 7', and the two portions 7, 7' are of equal size in the particular embodiment shown. The pole shoes 6 are of a magnetic material, such as motor steel or other soft ferromagnetic material having a substantial permeability, for the purpose of modifying magnetic flux fields, as hereinafter described.

An armature 9 is mounted to rotate between the arcuate shaped pole pieces 2 on a shaft 10 which is journaled in a bearing 11 on the end of the motor shell 1, and in a bearing (not shown) on a cap (not shown) at the other end of the motor shell 1. Such bearing support for the right hand end of the shaft 10 may comprise a part of the casing of the device to be driven, and therefore has not been shown. The armature 9 has a plurality of armature teeth 12 separated by slots 13 which receive armature windings 14. The armature windings 14 terminate in a commutator 15 which is mounted on the armature shaft 10 adjacent the armature 9. The armature windings 14 are energized through brushes (not shown) which contact the commutator 15.

In operation, a motor embodying the present invention is basically the same as that of any other permanent magnet motor, except in certain specific respects. The armature 9 draws a current through the windings 14 that establishes magnetic field components in the armature 9 crosswise to pole flux, so as to be generally horizontally oriented as seen in FIG. 2. Such magnetic field components due to armature current are a maximum when the armature is held in locked position, and the portion of the magnetic field set up by the armature 9 which impinges upon the pole pieces 2 will be strongest at their pole tips 3 and 4. The intensity of the magnetic field will decrease towards the air gaps 8 between the pole shoe portions 7 and 7' at the center of the pole pieces 2. Since the permeability of the ceramic pole cores 5 is approximately equal to air, that is of the magnitude of the order of unity, the effect of the armature field upon the pole cores 5 in the absence of the shoes 6, will be greatest at the pole tips 3 and 4. It will tend to demagnetize the trailing tips 4 and magnetize the leading tips 3 of the pole pieces 2, and if the magnetic field component due to armature current is of sufficient intensity it will demagnetize the trailing tips 4 entirely. However, the relatively highly permeable pole shoes 6 present paths of low reluctance to the magnetic field that will tend to shunt the magnetic lines of force away from the tips 3 and 4 toward the center of the pole cores 5. The magnetic flux is thus distributed over a larger area of the pole cores 5, and hence, the pole cores 5 are able to withstand a much stronger magnetic field without loss of magnetization.

The length of the air gap 8 may also be critical in some embodiments. In the embodiment shown, the air gap 8 is slightly greater than the width of one of the armature teeth 12. Where the air gap 8 is less than the width of an armature tooth 12, the space 16 between the armature 9 and the pole shoes 6 is so minute that a low reluctance magnetic path could develop jumping the space 16 through an armature tooth 12 and thus shunting the air gap 8. Hence, by increasing the size of the air gap 8 beyond the width of an armature tooth 12 such potential magnetic circuit is interrupted.

It will be noted that the embodiment described is adapted for low speed motors. The use of high permeability shoes 6 in high speed motors may give rise to eddy current problems, since shoes 6 are usually of a motor grade steel. However, those skilled in the art will readily perceive ways of adapting well known expedients, such as laminating, to minimize eddy currents in the shoes 6.

Finally, one of the advantages flowing from the present invention is readily apparent in the structure shown in FIG. 1. There it will be noted that the ends of the pole pieces 2 extend far beyond the ends of the armature 9, and, in fact the pole pieces 2 are only sufficiently shorter than the motor shell 1 to prevent a short circuiting of the magnetic field through the ends of the motor shell 1. Without the pole shoes 6, the only effective portions of the pole pieces 2 would be those directly adjacent to the armature 9. Hence, in order to obtain a motor of equivalent rating without the pole shoes 6, the armature 9 would need to be as long as the pole pieces 2, thus greatly increasing the overall length of the motor. However, according to the present invention the highly permeable shoes 6 will conduct the magnetic lines of force between the extended ends of the pole pieces 2 and the armature 9.

In summary, the contribution of the present invention to the art permits the production of permanent magnet dynamos of dramatically improved performance rating over prior art devices for any given overall size.

We claim:

1. A pole for a permanent field magnet of a dynamo comprising the combination of
 - a ferrite permanent magnet pole core having a pole face, and said pole face having a leading edge and a trailing edge; and
 - a pair of pole shoe portions of relatively high permeability that are mounted upon the face of said pole core, one adjacent said leading edge and the other adjacent said trailing edge, said pole shoes being spaced to define an air gap therebetween sufficient to present a high reluctance barrier to the formation of a magnetic circuit.

2. A permanent magnet dynamo comprising the combination of
 - a cylindrical dynamo shell of magnetic material;
 - permanently magnetized ferrimagnetic pole cores mounted on an inward facing surface of said dynamo shell and having pole faces directed radially inward toward the center of said cylindrical motor shell;
 - an armature with circumferentially spaced winding slots mounted to rotate within said dynamo shell and between said pole cores;
 - and pole shoes having high permeability mounted upon the faces of said field pole cores, each shoe being axially split to provide an air gap between adjacent shoe portions of a width greater than the distance between said winding slots.

3. In a magnetically short pole piece for a permanent magnet dynamo having high resistance to lock rotor demagnetization, the combination comprising:
 - a permanent magnet pole core of ferrimagnetic material having an extremely short magnetic length separating its poles, an inner face with a trailing edge at one pole, and an outer face at the opposite pole;
 - and a thin ferromagnetic pole shoe mounted across less than the entire inner face of said pole core and over said trailing edge to prevent concentration of demagnetizing flux at said trailing edge.

4. A pole piece for a permanent magnet dynamo comprising the combination of a permanent magnetized ferrite pole core of extremely short magnetic length, having one pole at an inner face and an opposite pole at an outer face, said inner face having a leading edge and a trailing edge;

and a pair of thin, ferromagnetic pole shoes mounted on said inner face of said pole core to distribute armature flux over the face of said pole core, one of said pole shoes being mounted over said leading edge of said pole core and the other of said pole shoes being mounted over said trailing edge of said pole core, said pole shoes being separated by an air gap sufficiently wide to prevent shunting of armature flux around said pole core.

5. A pole piece for a permanent magnet dynamo comprising the combination of a permanently magnetized pole core having permeability approximately equal to the permeability of air, extremely short magnetic length, its magnetic poles being located on inner and outer faces of said pole cores, said inner face having a leading edge and a trailing edge;

and a pair of thin, high permeability pole shoes mounted over said leading edge and said trailing edge of said inner face of said pole core to prevent armature flux concentration at said leading and trailing edges, said pole shoes being separated by a high reluctance gap to prevent shunting of armature flux around said pole core.

References Cited by the Examiner
UNITED STATES PATENTS

| | | | |
|---|---|---|---|
| 2,059,886 | 11/1936 | Merrill | 310—154 |
| 3,083,310 | 3/1963 | Tweedy et at. | 310—254 |
| 3,083,311 | 3/1963 | Krasnow | 310—156 |

MILTON O. HIRSHFIELD, *Primary Examiner.*

J. J. SWARTZ, *Assistant Examiner.*

UNITED STATES PATENT OFFICE
CERTIFICATE OF CORRECTION

Patent No. 3,277,324                                        October 4, 1966

Leonard W. Beaudoin et al.

It is hereby certified that error appears in the above numbered patent requiring correction and that the said Letters Patent should read as corrected below.

Column 5, line 3, for "permanent" read -- permanently --; line 3, for "extremel;" read -- extremely --; line 7, for "shores" read -- shoes --.

Signed and sealed this 22nd day of August 1967.

(SEAL)
Attest:

ERNEST W. SWIDER                                 EDWARD J. BRENNER
Attesting Officer                                    Commissioner of Patents